(12) United States Patent
Ribarov et al.

(10) Patent No.: US 8,899,516 B2
(45) Date of Patent: Dec. 2, 2014

(54) COAXIAL CONTRA-ROTATING MOTORS FOR DIFFERENTIAL LANDING GEAR STEERING

(75) Inventors: Lubomir A. Ribarov, West Hartford, CT (US); Jacek F. Gieras, Glastonbury, CT (US)

(73) Assignee: JHamilton Sundstrand Corporation, Windsor Locks, CT (US)

( * ) Notice: Subject to any disclaimer, the term of this patent is extended or adjusted under 35 U.S.C. 154(b) by 239 days.

(21) Appl. No.: 13/440,192

(22) Filed: Apr. 5, 2012

(65) Prior Publication Data

US 2013/0264414 A1   Oct. 10, 2013

(51) Int. Cl.
*B64C 25/50* (2006.01)

(52) U.S. Cl.
USPC ............. 244/50; 244/51; 244/62; 244/100 R; 244/102 R

(58) Field of Classification Search
USPC ...... 244/50, 51, 60, 62, 100 R, 103 R, 103 S, 244/111; 180/6.5, 6.51, 65.1, 65.51; 310/114
See application file for complete search history.

(56) References Cited

U.S. PATENT DOCUMENTS

| | | | |
|---|---|---|---|
| 4,046,339 A | 9/1977 | Stancliffe | |
| 4,422,604 A | 12/1983 | Turiot et al. | |
| 4,681,284 A | 7/1987 | Veaux et al. | |
| 4,984,755 A | 1/1991 | Derrien | |
| 5,002,143 A | 3/1991 | Bernard et al. | |
| 5,362,015 A | 11/1994 | Derrien et al. | |
| 6,732,979 B1 | 5/2004 | Kilner et al. | |
| 6,769,251 B2 | 8/2004 | Collet et al. | |
| 6,817,175 B2 | 11/2004 | Collet et al. | |
| 7,830,057 B2 | 11/2010 | Gieras | |
| 7,883,054 B2 | 2/2011 | Elliott et al. | |
| 8,070,094 B2 | 12/2011 | Collins | |
| 8,123,161 B1 | 2/2012 | Collins | |
| 2006/0038068 A1 | 2/2006 | Sullivan | |
| 2006/0192453 A1 | 8/2006 | Gieras et al. | |
| 2008/0142284 A1* | 6/2008 | Qu et al. | 180/65.6 |
| 2008/0179146 A1 | 7/2008 | Sullivan | |
| 2009/0040072 A1 | 2/2009 | Read et al. | |
| 2009/0261197 A1 | 10/2009 | Cox et al. | |
| 2009/0294578 A1* | 12/2009 | Humphrey | 244/50 |
| 2010/0006699 A1 | 1/2010 | Sullivan | |
| 2010/0236849 A1 | 9/2010 | Wishart | |

FOREIGN PATENT DOCUMENTS

| | | |
|---|---|---|
| GB | 2471213 B | 5/2011 |
| WO | 2008048393 A2 | 4/2008 |

OTHER PUBLICATIONS

Caricchi, F., Crescimbini, F., and Santini, E., "Basic Principle and Design Criteria of Axial-Flux PM Machines Having Counterrotating Rotors," IEEE Trans. on Industry Applications, vol. 31, No. 5, pp. 10562-11068 (1995).

* cited by examiner

*Primary Examiner* — Tien Dinh
*Assistant Examiner* — Nicholas McFall
(74) *Attorney, Agent, or Firm* — Carlson, Gaskey & Olds, PC

(57) ABSTRACT

A landing gear for an aircraft has a pair of spaced wheels, and a drive and steering arrangement operable to drive each of the wheels in either rotational direction. The drive and steering arrangement includes two permanent magnet rotors, with each of the permanent magnet rotors connected to rotate with one of the wheels. A single stator is positioned to drive both of the rotors. The drive and steering arrangement is mounted between the pair of wheels.

1 Claim, 1 Drawing Sheet

COAXIAL CONTRA-ROTATING MOTORS FOR DIFFERENTIAL LANDING GEAR STEERING

BACKGROUND OF THE INVENTION

This application relates to a steering and drive arrangement which simplifies a landing gear assembly for an aircraft.

Aircraft are typically provided with a pair of nosewheel tires which are deployable from the underside of the frame as part of the landing gear. The nosewheel tires must steer the aircraft, and must also be retractable and deployable.

To provide steering the prior art has typically required some form of hydraulic steering mechanism, and associated valves, controls, etc. Further, a lubrication system has often been required for the steering system. A drive arrangement is also required.

All of this has resulted in mechanical complexity, and has raised reliability and operational concerns.

SUMMARY OF THE INVENTION

A landing gear for an aircraft has a pair of spaced wheels, and a drive and steering arrangement operable to drive each of the wheels in either rotational direction. The drive and steering arrangement includes two permanent magnet rotors, with each of the permanent magnet rotors connected to rotate with one of the wheels. A single stator is positioned to drive both of the rotors. The drive and steering arrangement is mounted between the pair of wheels.

These and other features of the invention would be better understood from the following specifications and drawings, the following of which is a brief description.

DETAILED DESCRIPTION

Figure 1:
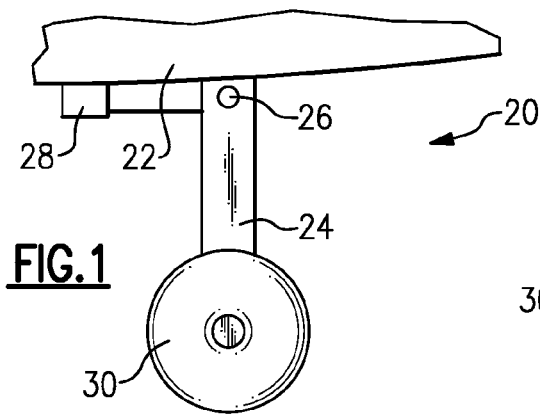
FIG. 1 schematically shows an aircraft nosewheel.

FIG. 1 shows an aircraft 20 including an aircraft body 22 having a deployable and retractable landing gear 24. A pivot point 26 is shown associated with an actuator 28, which schematically refers to the ability for the landing gear 24 to be pulled to a stowed position within the vehicle body 22, or extended to the illustrated landing position. A nosewheel 30 is shown.

Figure 2:
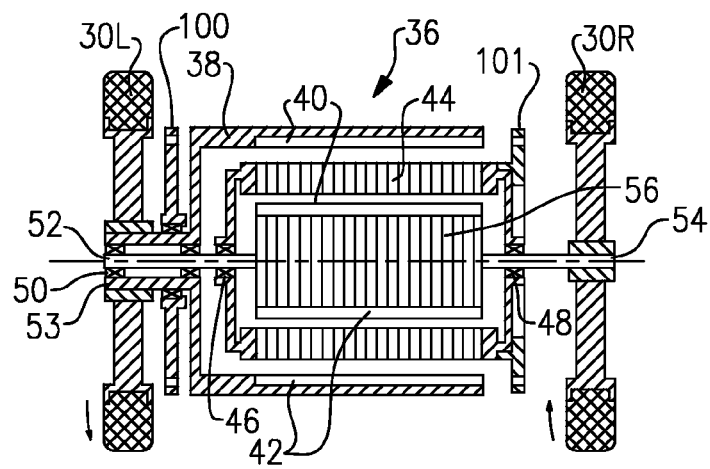
FIG. 2 shows a combined steering and drive assembly for an aircraft nosewheel.

As shown in FIG. 2, there are actually two nosewheels, with a left nosewheel 30L and a right nosewheel 30R. A drive and steering arrangement 36 is provided for wheels 30L and 30R.

A permanent magnet motor, including a stator 44 is mounted on a shaft 52/54 rotating with a rotor 56. The stator 44 is mounted on bearings 46 and 48 on the shaft 52/54, respectively. The stator 44 is supported by a static support 101. The shaft 54 is attached to rotate with the wheel 30R.

A second rotor 38 is shown as part of the drive and steering arrangement 36. The rotor 38 includes a shaft 53. A pair of bearings 50 supports shaft 53 on shaft 52 in a cantilever manner. The rotor 38 is fixed to rotate with the wheel 30L.

As shown, shaft 53 may also be supported by a bearing and a static support 100.

Permanent magnets 40 and 42 are associated with the rotors 56 and 38. The distinct permanent magnets 40 and 42 allow the stator 44 and its associated coils to drive the two rotors 38 and 56 in either rotational direction, and in distinct rotational directions, as necessary, and as explained below.

The use of the stator 44 and intermediate rotors 38 and 56 results in a compact and well-supported arrangement. Also, note the motor is axially intermediate the wheel 30R and 30L.

Electric power is supplied to the coils of the stator 44 from the aircraft. It may be taken from the aircraft's onboard 28 volt DC power supply.

The operation of the drive and steering arrangement assembly 36 is illustrated in FIGS. 3A-D.

Figure 3A:
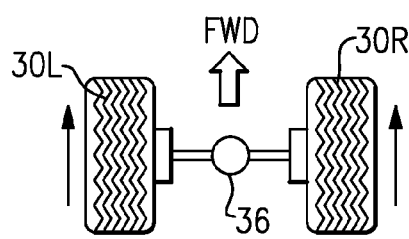
FIG. 3A shows a first drive scheme.

As shown in FIG. 3A, if both wheels 30L and 30R are driven in a forward direction, the aircraft will move forwardly.

Figure 3B:
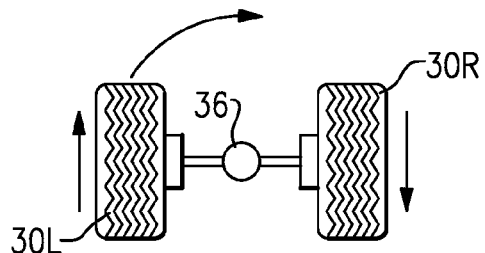
FIG. 3B shows a second drive scheme.

As shown in FIG. 3B, the wheel 30L is driven forwardly while the wheel 30R is driven rearwardly. In this instance, the aircraft will turn to the right.

Figure 3C:
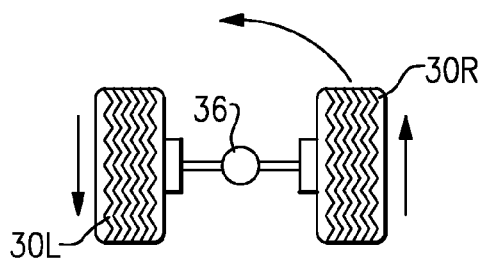
FIG. 3C shows a third drive scheme.

Conversely, as shown in FIG. 3C, the vehicle is turned to the left by driving the wheel 30R forwardly and the wheel 30L rearwardly.

Figure 3D:
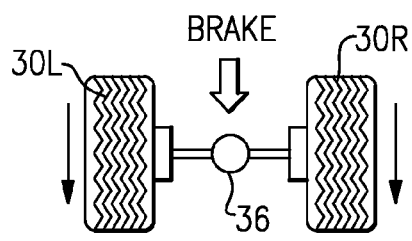
FIG. 3D shows a braking method.

In one last method, as shown in FIG. 3D, if both wheels are driven rearwardly, this will act as an effective brake on the aircraft.

Tire pressure monitoring sensors can be integrated into the drive and steering arrangement 36. Such sensors can be compact lightweight Hall-effect sensors utilizing the magnetic fields already established by the permanent magnet rotors.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A landing gear for an aircraft comprising:
a pair of spaced wheels, and a drive and steering arrangement operable to drive each of the wheels in either rotational direction;
said drive and steering arrangement including a pair of permanent magnet rotors, with each of said permanent magnet rotors connected to rotate with one of said wheels;
a single stator positioned to drive both of said rotors;
said single stator being radially intermediate an outer one of said two rotors and an inner one of said two rotors;
said inner one of said two rotors has a shaft with a pair of spaced bearings, and said shaft being supported within said stator by said pair of spaced bearings;
said outer one of said rotors being mounted on said shaft of said inner one of said rotors;
said outer one of said rotors being connected to rotate with one of said wheels, and said shaft of said inner one of said rotors supported on bearings within said outer one of said rotors; and;
said rotor associated with one of said wheels is driven in a first rotational direction and a rotor associated with the other of said wheels is driven in an opposed direction to cause an airplane receiving the landing gear to turn;
both of said wheels are driven by their respective rotors in a forward direction to cause the aircraft to move forwardly;

both of said rotors are driven in a rearward direction to cause a braking effect on an aircraft receiving said landing gear; and said landing gear has an actuator for moving said pair of spaced wheels between a stowed and extended position when mounted on an aircraft.

\* \* \* \* \*

UNITED STATES PATENT AND TRADEMARK OFFICE
CERTIFICATE OF CORRECTION

| | | |
|---|---|---|
| PATENT NO. | : 8,899,516 B2 | Page 1 of 1 |
| APPLICATION NO. | : 13/440192 | |
| DATED | : December 2, 2014 | |
| INVENTOR(S) | : Lubomir A. Ribarov et al. | |

It is certified that error appears in the above-identified patent and that said Letters Patent is hereby corrected as shown below:

ON THE TITLE PAGE:

item (73), Assignee information should read as follows:

--Hamilton Sundstrand Corporation--

Signed and Sealed this
Seventeenth Day of March, 2015

Michelle K. Lee
*Director of the United States Patent and Trademark Office*